United States Patent
Liao et al.

(10) Patent No.: US 11,734,790 B2
(45) Date of Patent: Aug. 22, 2023

(54) METHOD AND APPARATUS FOR RECOGNIZING LANDMARK IN PANORAMIC IMAGE AND NON-TRANSITORY COMPUTER-READABLE MEDIUM

(71) Applicants: Ke Liao, Beijing (CN); Weitao Gong, Beijing (CN); Hong Yi, Beijing (CN); Wei Wang, Beijing (CN)

(72) Inventors: Ke Liao, Beijing (CN); Weitao Gong, Beijing (CN); Hong Yi, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 268 days.

(21) Appl. No.: 17/196,057

(22) Filed: Mar. 9, 2021

(65) Prior Publication Data
US 2021/0295478 A1    Sep. 23, 2021

(30) Foreign Application Priority Data
Mar. 17, 2020    (CN) .......................... 202010185255.5

(51) Int. Cl.
| | | |
|---|---|---|
| G06T 3/00 | (2006.01) | |
| G06T 5/00 | (2006.01) | |
| G06T 7/11 | (2017.01) | |
| G06T 7/168 | (2017.01) | |
| G06T 9/00 | (2006.01) | |
| G06T 3/40 | (2006.01) | |

(Continued)

(52) U.S. Cl.
CPC .............. *G06T 3/0068* (2013.01); *G06T 3/40* (2013.01); *G06T 5/006* (2013.01); *G06T 5/50* (2013.01); *G06T 7/11* (2017.01); *G06T 7/168* (2017.01); *G06T 9/00* (2013.01); *G06V 10/752* (2022.01); *G06V 20/176* (2022.01); *G06V 20/64* (2022.01); *G06V 20/647* (2022.01); *G06V 20/70* (2022.01); *G06T 2207/30256* (2013.01)

(58) Field of Classification Search
USPC .......................................... 382/173–174, 275
See application file for complete search history.

(56) References Cited

U.S. PATENT DOCUMENTS

| | | | | |
|---|---|---|---|---|
| 8,270,770 B1 * | 9/2012 | Jin | ............................ | G06T 7/11 382/285 |
| 2015/0371440 A1 * | 12/2015 | Pirchheim | ................. | G06T 7/73 345/419 |

(Continued)

OTHER PUBLICATIONS

DS-PASS: Detail-Sensitive Panoramic Annular Semantic Segmentation through SwaftNet for Surrounding Sensing; Kailun Yang1, Xinxin Hu2, Hao Chen2, Kaite Xiang2, Kaiwei Wang2 and Rainer transportaarXiv: 1909.07721v2 [cs.CV] Feb. 7, 2020 (Year: 2020).*

*Primary Examiner* — Ishrat I Sherali
(74) *Attorney, Agent, or Firm* — IPUSA, PLLC (57) ABSTRACT

Disclosed are a method and apparatus for recognizing a landmark in a panoramic image. The method includes steps of performing projection transformation on the panoramic image so as to generate a projection image; conducting semantic segmentation on the projection image so as to determine a landmark region and a road surface region; correcting distortion in the landmark region so as to produce a corrected landmark region; and recognizing the landmark in the corrected landmark region.

11 Claims, 8 Drawing Sheets

(51) Int. Cl.
  *G06T 5/50* (2006.01)
  *G06V 20/64* (2022.01)
  *G06V 10/75* (2022.01)
  *G06V 20/70* (2022.01)
  *G06V 20/10* (2022.01)

(56) References Cited

U.S. PATENT DOCUMENTS

2017/0314954 A1\* 11/2017 Golding ............. G01C 21/3644
2018/0253879 A1\* 9/2018 Li ............................ G06T 7/70
2022/0027656 A1\* 1/2022 Jia ............................ G06T 7/11

\* cited by examiner

METHOD AND APPARATUS FOR RECOGNIZING LANDMARK IN PANORAMIC IMAGE AND NON-TRANSITORY COMPUTER-READABLE MEDIUM

BACKGROUND OF THE DISCLOSURE

1. Field of the Disclosure

The present disclosure relates to the field of image processing, and more particularly relates to a method and apparatus for recognizing a landmark in a panoramic image as well as a non-transitory computer-readable medium.

2. Description of the Related Art

In recent years, panoramic technology has been widely applied to image processing. Panoramic images may show the environment around photographers as richly as possible by means of wide-angle expression as well as paintings, photos, videos, 3D (three-dimensional) models, etc. A panoramic image taken by a user may include various landmarks such as tourist spots, hotels, and sculptures. By recognizing and marking these kinds of landmarks, the user may be given a realistic sense of presence and an interactive feeling.

Most of the existing landmark recognition models are suitable for ordinary images, and they have a better recognition effect on the ordinary images. However, due to the distortion in panoramic images, the existing landmark recognition models may produce large errors when performing landmark recognition on the panoramic images. As such, current methods for recognizing landmarks in panoramic images often rely on manual judgement. That is, a captured panoramic image needs to be manually compared with a large number of known landmarks in a database, thereby resulting that the efficiency and accuracy of recognition are relatively low.

Therefore, there is a need for a landmark recognition technology that may automatically recognize a landmark in a panoramic image and cope with the distortion in the panoramic image.

SUMMARY OF THE DISCLOSURE

In light of the above, the present disclosure provides a method and apparatus for recognizing a landmark in a panoramic image, by which it is possible to increase the efficiency and accuracy of landmark recognition.

According to a first aspect of the present disclosure, a method of recognizing a landmark in a panoramic image is provided that may include steps of performing projection transformation on the panoramic image so as to generate a projected image (also called a projection image); conducting semantic segmentation on the projection image so as to determine a landmark region and a road surface region; correcting distortion in the landmark region so as to produce a corrected landmark region (also called a correction landmark region); and recognizing the landmark in the correction landmark region.

According to a second aspect of the present disclosure, an apparatus for recognizing a landmark in a panoramic image is provided that may contain a processor and a storage connected to the processor. The storage stores computer-executable instructions that, when executed by the processor, may make the processor to implement the method of recognizing a landmark in a panoramic image.

According to a third aspect of the present disclosure, an apparatus for recognizing a landmark in a panoramic image is provided that may be inclusive of a projection transformation part configured to perform projection transformation on the panoramic image so as to generate a projection image; an image segmentation part configured to conduct semantic segmentation on the projection image so as to determine a landmark region and a road surface region; a distortion correction part configured to correct distortion in the landmark region so as to produce a correction landmark region; and a landmark recognition part configured to recognize the landmark in the correction landmark region.

According to a fourth aspect of the present disclosure, a computer-executable program and a non-transitory computer-readable medium are provided. The computer-executable program may cause a computer to conduct the method of recognizing a landmark in a panoramic image. The non-transitory computer-readable medium stores computer-executable instructions (i.e., the computer-executable program) for execution by a computer involving a processor. The computer-executable instructions, when executed by the processor, may render the processor to perform the method of recognizing a landmark in a panoramic image.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constructional elements having basically the same function and structure, and the repetition of the explanations to the constructional elements is omitted.

Figure 1:
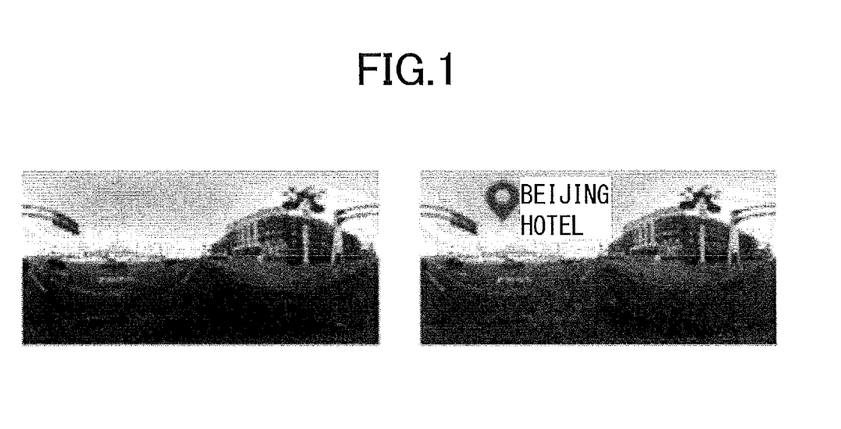
FIG. 1 illustrates a scene that may apply the technology of recognizing a landmark in a panoramic image according to the embodiments of the present disclosure.

FIG. 1 illustrates a scene that may apply the technology of recognizing a landmark in a panoramic image in accordance with the embodiments of the present disclosure.

As shown in the left image of FIG. 1, a user may utilize a panoramic camera to capture a street view in which a road surface, a landmark like a building, and various objects such as vehicles on the road surface and the like may be included. Recognizing and marking the landmark in the street view may enrich the captured contents. For example, it is possible to detect the landmark in the street view (i.e., the captured panoramic image) and identify the landmark therein as "BEIJING HOTEL". Furthermore, as presented in the right image of FIG. 1, by marking the identified landmark, the interest of the user and the interaction with the user may be enhanced. However, as described above, because of the distortion in the captured panoramic image, the conventional landmark recognition methods may generate large errors. As a result, most of the current methods of recognizing landmarks in panoramic images still depend on manual assessment, thereby resulting that the efficiency and accuracy of recognition are relatively low.

Considering the above, in order to be able to automatically recognize a landmark in a panoramic image without being affected by the distortion in the panoramic image, a technology for recognizing the landmark in the panoramic image based on semantic segmentation and distortion elimination is proposed in the present disclosure. By performing projection transformation on the panoramic image and carrying out semantic segmentation, it is possible to divide the panoramic image into a road surface region and a landmark region. Next, by conducting a correction process of removing the distortion on the landmark region and a recognition process on the landmark region after the distortion is eliminated, it is possible to increase the efficiency and accuracy of landmark recognition in the panoramic image.

In what follows, for the sake of convenience, a panoramic image acquired by photographing a street view is taken as an example for describing the technology of recognizing a landmark in the panoramic image provided in the present disclosure. However, this is just an illustration; that is, the present disclosure is not limited to such an example. The landmark recognition technology may also be applied to various scenes such as panoramic roaming, panoramic vision, immersive fitness, and so on.

First Embodiment

Figure 2:
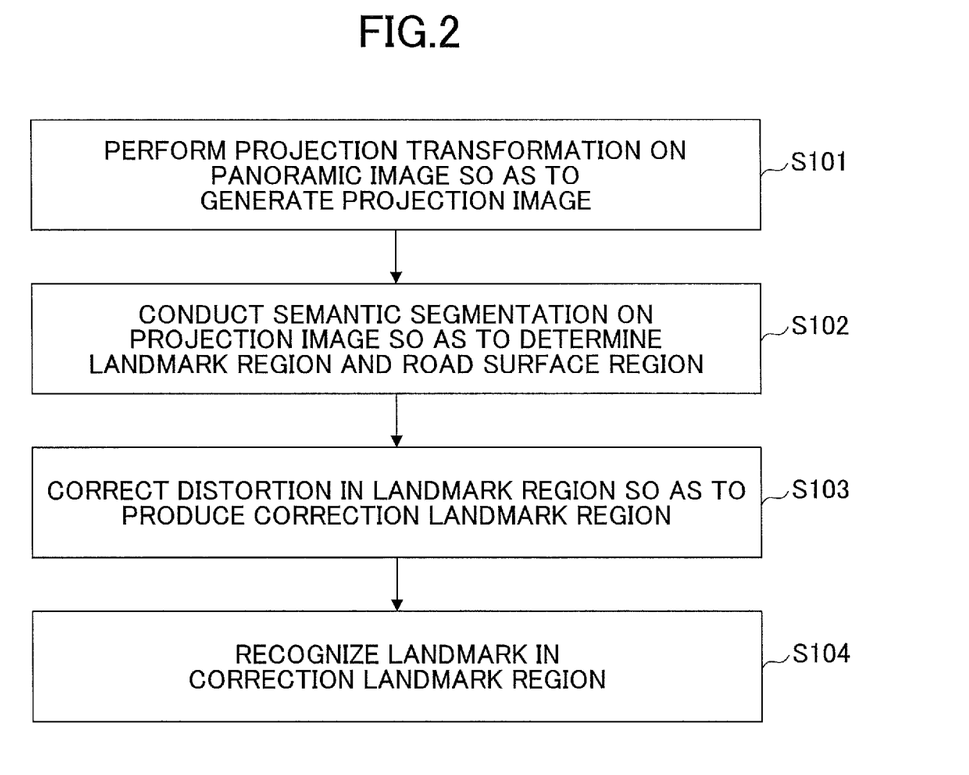
FIG. 2 is a flowchart of a method of recognizing a landmark in a panoramic image according to a first embodiment of the present disclosure.

FIG. 2 is a flowchart of a method (also called a landmark recognition method) of recognizing a landmark in a panoramic image according to a first embodiment.

Here it should be noted that in the embodiments of the present disclosure, a panoramic image and a panoramic video may be used interchangeably. Moreover, the landmark recognition method in accordance with this embodiment may be applied to a panoramic image or at least one frame in a panoramic video captured by a user so as to recognize a landmark therein. Additionally, in the embodiments of the present disclosure, landmarks refer to buildings or objects with iconic characteristics on the outside of road surfaces such as tourist attractions, restaurants, theaters, sculptures, and the like.

As shown in FIG. 2, the landmark recognition method is inclusive of STEPS S101 to S104.

In STEP S101, projection transformation is performed on the panoramic image so as to generate a projection image.

Various projection approaches may be adopted in this embodiment, for example, equirectangular projection, cubemap projection, fisheye projection, cylindrical projection, and stereographic projection for little planet views. Hereinafter, for the sake of convenience, the stereographic projection is taken as an example for illustration.

Figure 3:
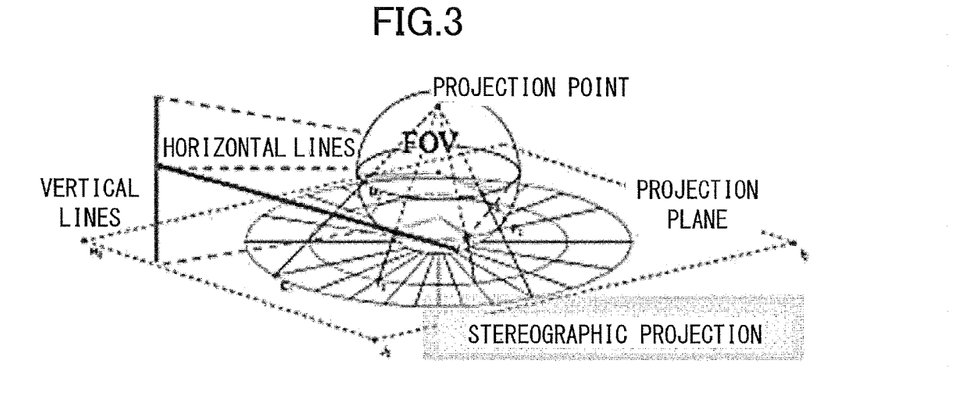
FIG. 3 illustrates the principle of transformation based on stereographic projection for little planet views (also called stereographic projection based transformation) in the method according to the first embodiment.

FIG. 3 illustrates the principle of stereographic projection based transformation (i.e., transformation based on stereographic projection for little planet views).

In general, conducting stereographic projection based transformation with respect to a panoramic image mainly includes the following two steps. First, the panoramic image is pasted on a spherical surface according to expansion based on longitude and latitude lines. Particularly, when taking the horizontal lines and the vertical lines in an actual scene presented in FIG. 3 as an example, the horizontal lines are pasted to the longitude lines, and the vertical lines are pasted to the latitude lines. Second, the coordinates on the spherical surface are projected from the projection point into a circle on the projection plane on the basis of a certain projection angle (i.e., a certain field of view (FOV)) so as to acquire a projection image. The specific transformation approaches based on stereographic projection are well-known in the related art, so the details of them are omitted here.

The inventors of the present application noticed that when carrying out stereographic projection based transformation on a panoramic image, different projection points and projection angles selected may influence the follow-on landmark recognition accuracy. For example, in FIG. 3, the farther the projection point is (relative to the projection plane where the south pole or the north pole is located), the larger the projection angle is, and the greater the proportion of sky pixels in the corresponding projection image is. This ensures that the region where a landmark is located is relatively large, so that the features related to the landmark may be extracted more accurately and fully.

Figure 4:
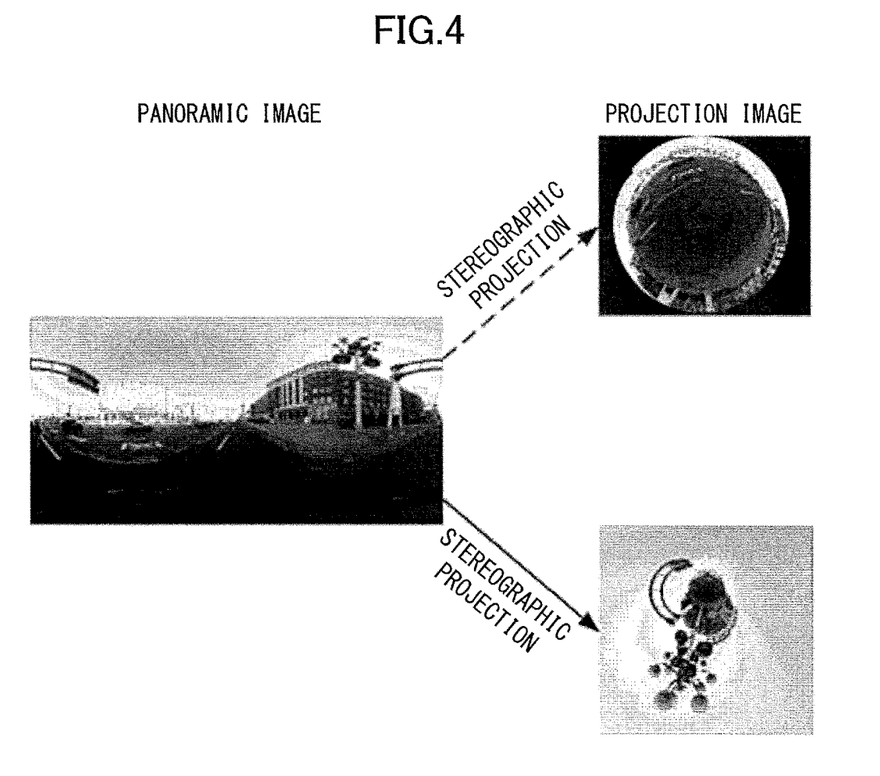
FIG. 4 illustrates projection transformation performed on a panoramic image using different projection angles in the method according to the first embodiment.

FIG. 4 illustrates projection transformation performed on a panoramic image using the same projection point and different projection angles.

As shown in FIG. 4, on the left side is a panoramic image containing a landmark, and the two images on the right side are projection images obtained by projecting the panoramic image onto a projection plane tangent to spherical surface at the south pole (i.e., the projection center) using the north pole as the same projection point and different projection angles. In the upper projection image on the right side in this drawing, the valid region of the landmark is relatively small. By contrast, in the lower projection image on the right side in this drawing, the region where the landmark is located is relatively large, thereby being capable of completely and accurately extracting the features relating to the landmark, which are beneficial to the subsequent landmark recognition.

In this embodiment, optionally, it is possible to determine, based on a proportion of sky pixels in a projection image, a projection point and a projection angle for projection transformation. For example, regarding different projection points and different projection angles, the proportions of sky pixels in the projection images may be observed, so that a proper projection point and a suitable projection angle may be selected. In this way, the region of a road surface may become relatively small, whereas the region of a landmark may turn relatively large. This results in being able to accurately and fully extract the features relevant to the landmark. As an instance, it is possible to choose a projection point and a projection angle for projection transformation so as to let the proportion of sky pixels in the whole projection image be greater than 50%.

Referring again to FIG. 2; in STEP S102, semantic segmentation is conducted with regard to the projection image so as to determine a landmark region and a road surface region.

As set forth above, a panoramic image may include various objects such as a road surface, vehicles and signs on the road surface, a landmark on the outside of the road surface, and so on. In order to accurately recognize the landmark therein, one possible way is to reduce the impact of the road surface on the detection result as much as possible. On that account, it is necessary to determine the landmark region and the road surface region. In the embodiments of the present disclosure, semantic segmentation is utilized to perform vision processing on the projection image. On the basis of the high-level semantic characteristics of each visual element in the projection image, the meaning of the same visual element in the corresponding real scene may be understood more deeply, so that efficient and accurate segmentation can be carried out. The following takes a projection image attained after conducting stereographic projection based transformation on a panoramic image as an example, and describes it in detail based on FIG. 5 and FIG. 6.

Figure 5:
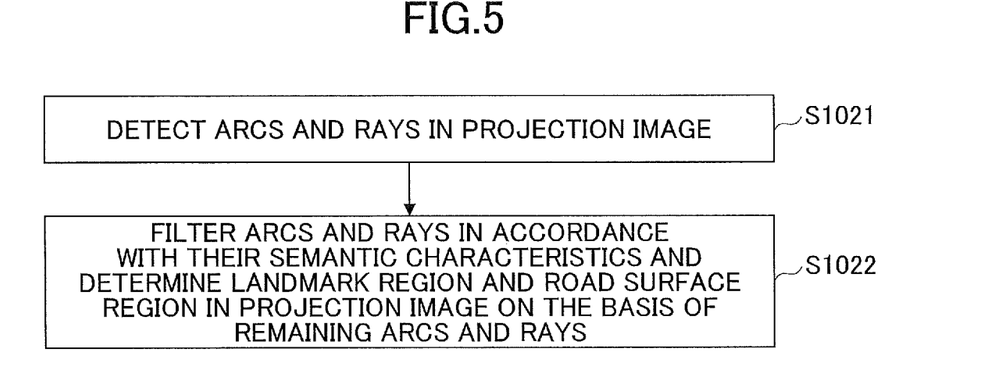
FIG. 5 is a flowchart of a semantic segmentation process conducted on a projection image in the method according to the first embodiment.

FIG. 5 is a flowchart of a semantic segmentation process conducted with respect to a projection image.

As presented in FIG. 5, the semantic segmentation process contains STEPS S1021 and S1022.

STEP S1021 is detecting arcs and rays in a projection image.

According to the principle of stereographic projection based transformation as described above, the arcs in the projection image represent the horizontal lines in the corresponding actual image, and the rays in the projection image stands for the vertical lines in the corresponding actual image. Consequently, the task of finding the horizontal lines and the vertical lines that may express the outline of a landmark in the corresponding actual scene is equivalent to seeking the arcs and rays in the projection image. Traditional computer vision processing approaches and deep learning approaches may be used to detect the arcs and rays in the projection image; however, the present disclosure is not limited to this.

STEP S1022 is performing filtering on the detected arcs and rays in accordance with their semantic characteristics and determining a landmark region and a road surface region in the projection image on the basis of the filtered arcs and rays (i.e., the remaining arcs and rays).

Because lane lines, roadbeds, and the like on the road surface region may also appear as arcs and rays in the projection image, the detected arcs and rays in STEP S1021 may include arcs and rays (also called noise arcs and noise rays, respectively) that are not corresponding to the landmark region. These kinds of noise arcs and noise rays may interfere with the follow-on landmark recognition result. Accordingly, it is necessary to filter the detected arcs and rays on the basis of the semantic characteristics of them so as to remove the noise arcs and the noise rays, then carry out semantic segmentation. In this step, as an example, based on the semantic characteristics of the detected arcs and rays, those arcs whose centers are not on the projection center and those rays that are not emitted from the projection center may be filtered out.

As depicted above, the horizontal lines in the corresponding actual scene correspond to the arcs in the projection image, and the vertical lines in the corresponding actual scene correspond to the rays in the projection image. As such, for the landmark on the outside of the road surface region, the arcs corresponding to the horizontal lines of the landmark in the projection image should be centered on the projection center of the projection plane, and the rays corresponding to the vertical lines of the landmark in the projection image should be emitted from the projection center of the projection plane (i.e., the extensions of the rays should pass through the projection center). On the grounds of this principle, it is possible to filter out those arcs whose centers are not on the projection center and those rays that are not emitted from the projection center. For ease of understanding, an example of the foregoing filtering process is described below by referring to FIG. 6.

Figure 6:
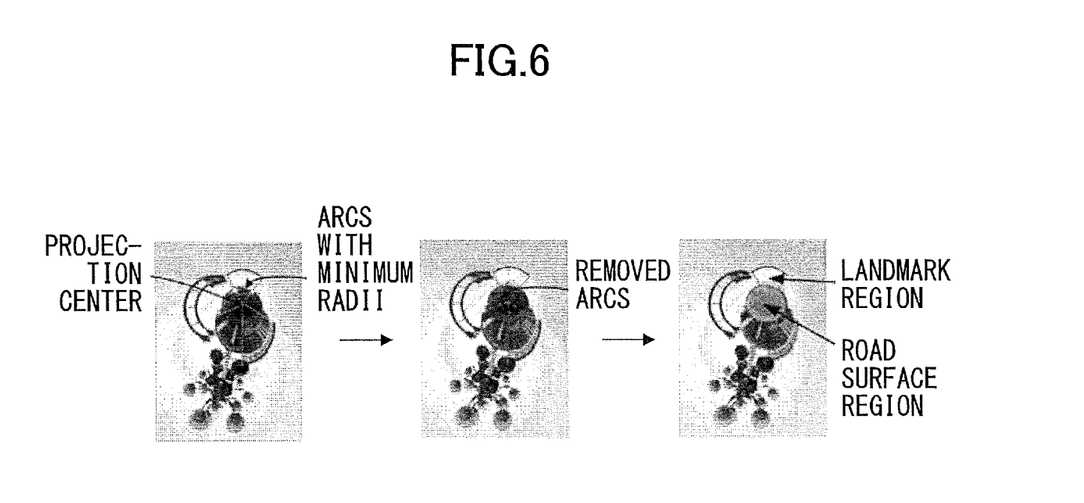
FIG. 6 illustrates semantic segmentation carried out with respect to a projection image in the method according to the first embodiment.

FIG. 6 illustrates semantic segmentation carried out with respect to a projection image.

In the image on the left side of FIG. 6, arcs and rays detected are illustrated. For clarity, only a part of the detected rays and arcs are shown. A projection center is also presented in the image on the left side of this drawing. It is possible to determine whether the extensions of the detected rays pass through the projection center, so as to determine whether the detected rays are emitted from the projection center; and determine whether the detected arcs are parts of circles whose centers on the projection centers. Subsequently, on the basis of this, those arcs whose centers are not on the projection center and those rays that are not emitted from the projection center can be eliminated. For example, the image in the middle of this drawing shows a result after the filtering process, in which the dotted arcs indicate those arcs that are filtered out inasmuch as they are not centered on the projection center.

In addition to the said filtering process based on whether the detected arcs and rays share the same projection center, other filtering rules may also be adopted in the embodiments of the present disclosure so as to filter out inappropriate arcs and rays on basis of the semantic characteristics of the detected arcs and rays.

For example, as an option, each arc with a radius less than a predetermined threshold may be filtered out. As shown in the left image of FIG. 6, based on the actual starting points (not the starting points on the above-mentioned extensions) of two detected rays on the projection image, it is possible to determine an arc having a minimum radius that may serve as a threshold (i.e., the predetermined threshold), corresponding to the landmark. Because a determined arc with a radius less than the predetermined threshold is unlikely to correspond to the landmark region (i.e., likely to belong to the road surface region), the determined arc can be taken away.

In another example, considering that an arc representing a road may meet its adjacent arcs end to end so as to form a closed region, whereas a noise arc corresponding to a roadbed, a sidewalk, and the like usually appears in the projection image as an isolated arc having no adjacent arcs and not being able to generate a closed region, this kind of isolated arc in the projection image can be taken out.

Here it should be noted that in the embodiments of the present disclosure, one or more of the said filtering rules may be utilized simultaneously or in sequence so as to filter out those noise arcs and those noise rays that do not correspond to the landmark region on the basis of the semantic characteristics of the detected arcs and rays, thereby being capable of reducing the influence of the road surface region on the accuracy of landmark detection.

Next, the road surface region and the landmark region may be segmented based on the remaining arcs and rays. Specifically, a closed region formed by the remaining arcs may be determined as the road surface region, and a fan-shaped region generated by the remaining rays and the remaining arcs outside the closed region may be determined as the landmark region. For example, as presented in the right image of FIG. 6, a closed region formed by the remaining adjacent arcs end to end may be determined as the road surface region, and a fan-shaped region generated by the remaining arcs and the remaining rays on the outside of the closed region may be determined as the landmark region. In particular, a fan-shaped region formed by two rays, an arc with a minimum radius determined based on the actual starting points of the two rays, and an arc having a maximum radius determined based on the end points of the two rays may be determined as the landmark region.

Referring again to FIG. 2; in STEP S103, the distortion in the landmark region is corrected so as to generate a correction landmark region.

As set forth above, the distortion in a panoramic image may lead to a large error in landmark recognition. In the embodiments of the present disclosure, a correction process for distortion removal is performed on the landmark region obtained after semantic segmentation so as to avoid the impact on the accuracy of landmark recognition due to the distortion. In the following, a landmark region acquired by carrying out semantic segmentation after stereographic projection based transformation is performed on a panoramic image is taken as an example, and the correction process is concretely described with reference to FIG. 7 to FIG. 9.

Figure 7:
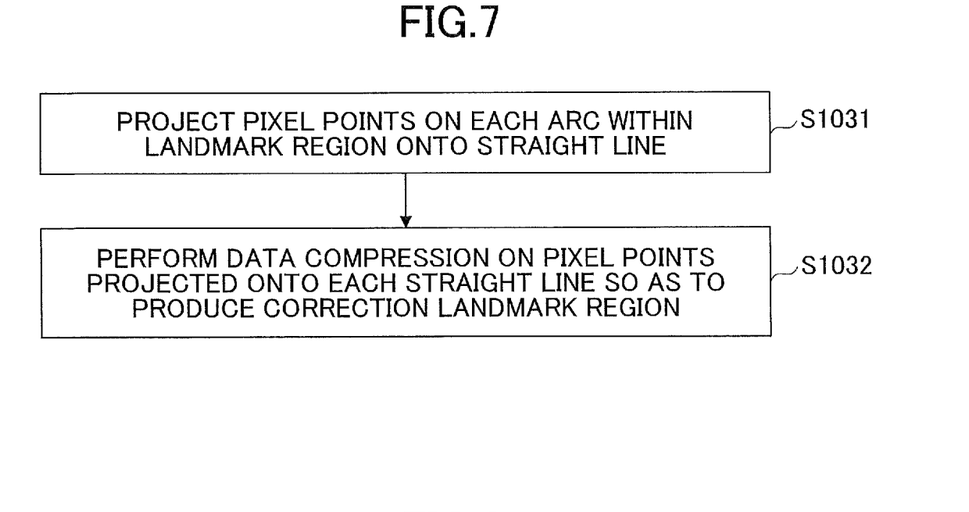
FIG. 7 is a flowchart of a correction process of correcting the distortion in a landmark region of a panoramic image in the method according to the first embodiment.

FIG. 7 is a flowchart of a correction process of correcting the distortion in a landmark region obtained.

As illustrated in FIG. 7, the correction process is inclusive of STEPS S1031 and S1032.

In STEP S1031, the pixel points on each arc within a landmark region are projected onto a corresponding straight line.

As said above, an arc in the projection image corresponds to a straight line in the related actual scene. As a result, in this step, by projecting the pixel points on each arc within the landmark region onto the corresponding straight line, it is possible to do away with the distortion introduced by the stereographic projection based transformation.

Figure 8:
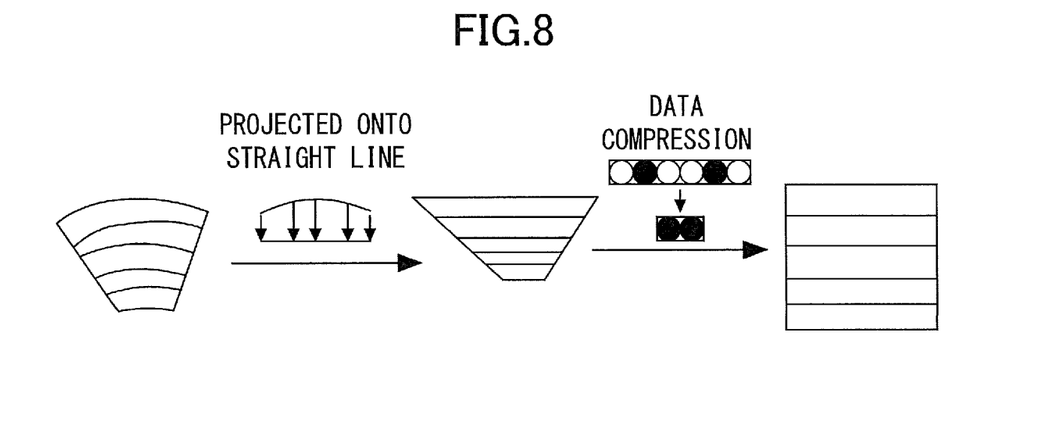
FIG. 8 illustrates distortion correction performed on a landmark region of a panoramic image in the method according to the first embodiment.

For example, as shown in FIG. 8 that illustrates distortion correction conducted on a landmark region of a panoramic image, for each arc determined in the landmark region with a fan shape (i.e., the leftmost image in this drawing), the pixel points on the same arc are projected onto a corresponding straight line, thereby generating a trapezoidal landmark region (i.e., the image in the middle of this drawing) from the fan-shaped landmark region.

In STEP S1032, data compression is carried out with respect to the pixel points projected onto each straight line so as to produce a correction landmark region.

Particularly, each arc in the fan-shaped landmark region and the corresponding straight line in the trapezoidal landmark region shown in FIG. 8 correspond to the same length of the same landmark in the relevant actual scene. Based on this principle, by performing data compression on each straight line in the trapezoidal landmark region obtained in STEP S1031, it is possible to make the number of pixel points on each straight line be the same.

For example, as presented in FIG. 8, six pixel points on a line segment of a straight line may be compressed into two data points so as to ensure that each straight line after data compression contains the same number of data points. In this way, a rectangular landmark region after correction (i.e., the rightmost image in this drawing) can be attained.

Figure 9:
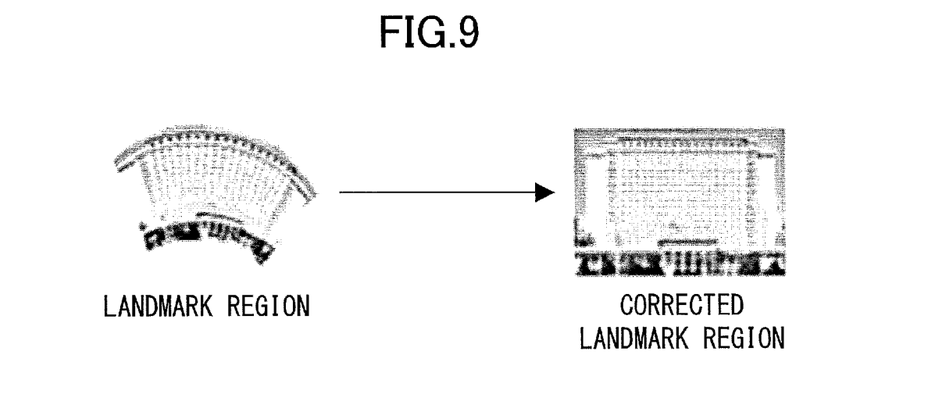
FIG. 9 illustrates a result obtained after conducting distortion correction in regard to a landmark region of a panoramic image in the method according to the first embodiment.

FIG. 9 illustrates a result obtained after conducting distortion correction in regard to a landmark region in a panoramic image by means of the exemplary correction process shown in FIG. 7. It is obvious from this drawing that the distortion in the landmark region has been basically eliminated.

The semantic segmentation and the correction process after the projection transformation conducted on the panoramic image have been described by taking the stereographic projection approach as an example. It is clear that after the stereographic projection based transformation is conducted, the road surface region is concentrated near the projection center in the projection plane. For this reason, the road surface region and the landmark region may be separated based on their semantic characteristics, and the influence of the road surface region on the landmark recognition result may be eliminated according to the arc and ray filtering rules, thereby being able to improve the accuracy of landmark recognition.

Here it should be noted that for other projection approaches, semantic segmentation and correction processing may be carried out similarly based on other image elements in the projection image combined with their geometric characteristics, so that it is also possible to determine a landmark region in which the distortion is filtered out on the basis of high-level semantic characteristics. Moreover, the embodiments of the present disclosure are not limited to the projection transformation approaches and the correction processes.

Again, referring to FIG. 2; in STEP S104, a landmark is recognized in the correction landmark region.

This step is performing landmark detection on the landmark region after the distortion therein is removed so as to acquire a detected landmark, then determining a landmark that most matches the detected landmark among from the known landmarks in a pre-built (i.e., predetermined) database. Various existing models and approaches may be employed to carry out the landmark detection and the matching processing so as to identify the landmark; however, the present disclosure is not limited to this.

As an example, in this embodiment, a two-stage process of rough landmark detection and precise landmark detection is adopted for performing landmark recognition. Generally speaking, a pre-built database may contain a large number of known landmark images. For each landmark, there are multiple known images corresponding to it but with large differences in background environment, shooting angles of view, lighting conditions, etc. Accordingly, searching for an image corresponding to a captured landmark image in a large number of known landmark images is a huge challenge for computer processing capacity. The two-stage process may effectively save computing resources when making a search among the known landmark images. Hereinafter, an exemplary approach for recognizing a landmark in a correction landmark region is minutely described by referring to FIG. 10 to FIG. 12.

Figure 10:
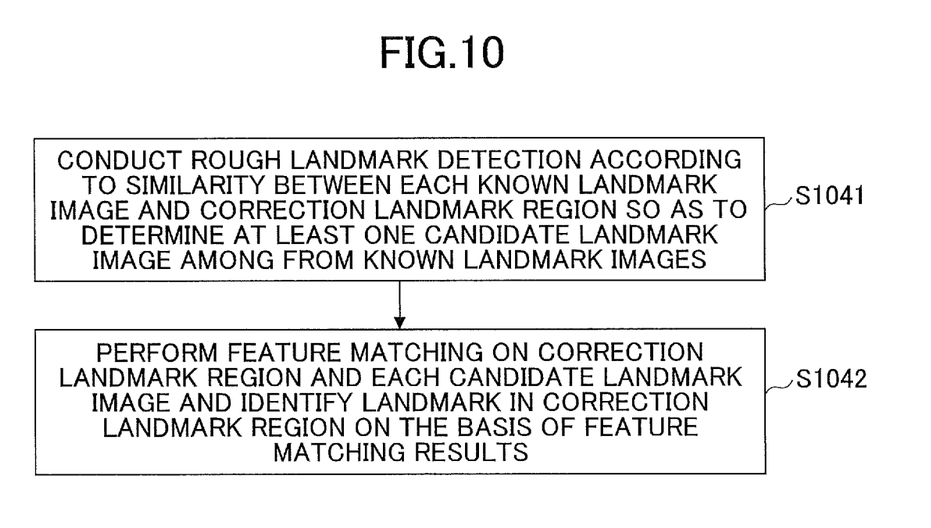
FIG. 10 is a flowchart of a landmark recognition process of recognizing a landmark in a correction landmark region of a panoramic image in the method according to the first embodiment.

FIG. 10 is a flowchart of a landmark recognition process of recognizing a landmark in a correction landmark region of a panoramic image.

As shown in FIG. 10, the landmark recognition process includes STEPS S1041 and S1042.

In STEP S1041, rough landmark detection is performed according to the similarity between each of a plurality of known landmark images and a correction landmark region so as to determine at least one candidate landmark image among from the plurality of known landmark images.

In this step, traditional computer vision processing approaches and deep learning approaches may be used to conduct landmark detection. For example, by comparing the similarity between the correction landmark region and each known landmark image, or by utilizing the output of a classifier based on a trained neural network with respect to the correction landmark region, it can be determined whether there is a possible landmark in the correction landmark region. If it is determined that there exists a possible landmark in the correction landmark region, then at least one candidate landmark image similar to the correction landmark region can be chosen among from the plurality of known landmark images.

As an example, a pre-built database containing a large number of known landmark images and a trained Faster RCNN (Regions with Convolutional Neural Networks) model may be adopted to detect the correction landmark region. Based on the model's classifier result, it is possible to determine whether the correction landmark region includes a landmark. If there is a landmark in the correction landmark region, then at least one candidate landmark image can be roughly selected among from the large number of known landmark images.

Figure 11:
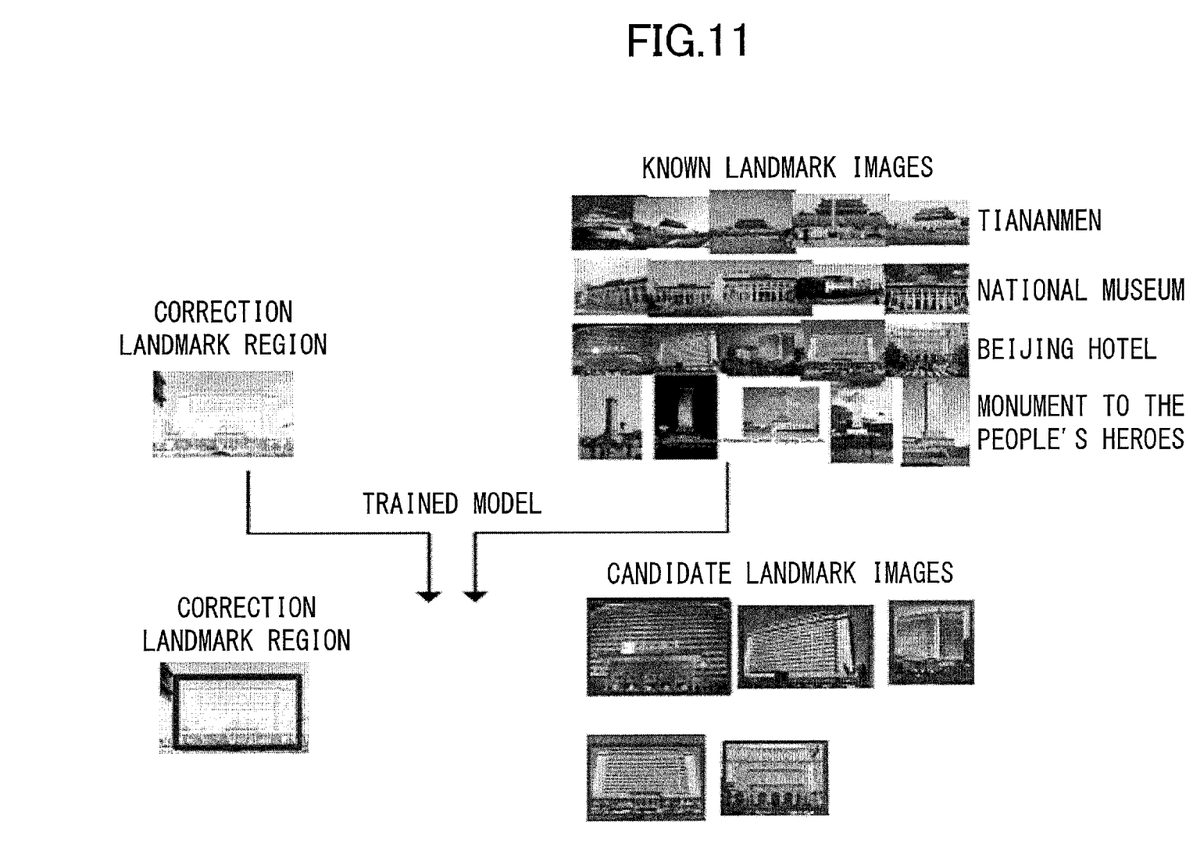
FIG. 11 illustrates determining candidate landmark images determined among from known landmark images in the method according to the first embodiment.

FIG. 11 illustrates an example of determining at least one candidate landmark image among from known landmark images.

In this example, a correction landmark region image and multiple known landmark images are input into a trained Faster RCNN model. By using this model to perform classification on the correction landmark region image, it is possible to determine at least one candidate landmark image likely to be as with the captured landmark in the correction landmark region among from the multiple known landmark images.

Optionally, because the correction landmark region may contain a part of background environment such as sky, cloud, etc., and since the correction landmark region may be quite different from the multiple known landmark images in background environment, shooting angles of view, lighting conditions, etc., when the trained Faster RCNN model is applied, a minimum bounding rectangle of the captured landmark (e.g., the rectangular frame in the bottom left image of FIG. 11) may be further determined based on the correction landmark region and the multiple known landmark images, so as to eliminate the influence of background factor differences on landmark matching.

Referring again to FIG. 10; in STEP S1042, feature matching is performed on the correction landmark region and each candidate landmark image, and a landmark in the correction landmark region is identified based on the feature matching results.

In this step, after the rough landmark detection is conducted with respect to the correction landmark region, more accurate landmark detection may be carried out on the basis of the at least one candidate landmark image obtained. Specifically, the correction landmark region is matched with each candidate landmark image, so that the landmark corresponding to the best matched candidate landmark image is used as the identified landmark. Various suitable approaches may be adopted to directly perform feature extraction and matching on the correction landmark region and each candidate landmark image.

Furthermore, considering that the resolution of the correction landmark region and each candidate landmark image acquired in STEP S1041 may be different, and this type of difference in scale may affect the image matching result, in this step, optionally, the correction landmark region and each candidate landmark image may be scaled to the same resolution, then feature extraction and matching may be performed on them.

Moreover, in a case where the minimum circumscribed rectangular frame of the landmark is further determined based on the correction landmark region and the known landmark images as described above, image scaling may also be carried out on the grounds of the determined minimum circumscribed rectangular frame of the landmark.

In the above solution of scaling the correction landmark region and each candidate landmark image to the same resolution, one or more of operators such as DELF (DEep Local Features), SURF (Speed Up Robust Feature), SIFT (Scale Invariant Feature Transform), BRIEF (Binary Robust Independent Elementary Features), GIST (Generalized Search Tree), and VLAD (Vector of Locally Aggregated Descriptors) based operators, etc. may be utilized to extract various features (of course, it is also possible to extract only one feature as need) in the scaled landmark region and each candidate landmark image needing to be matched, so as to procure the matched feature points between the two.

Figure 12:
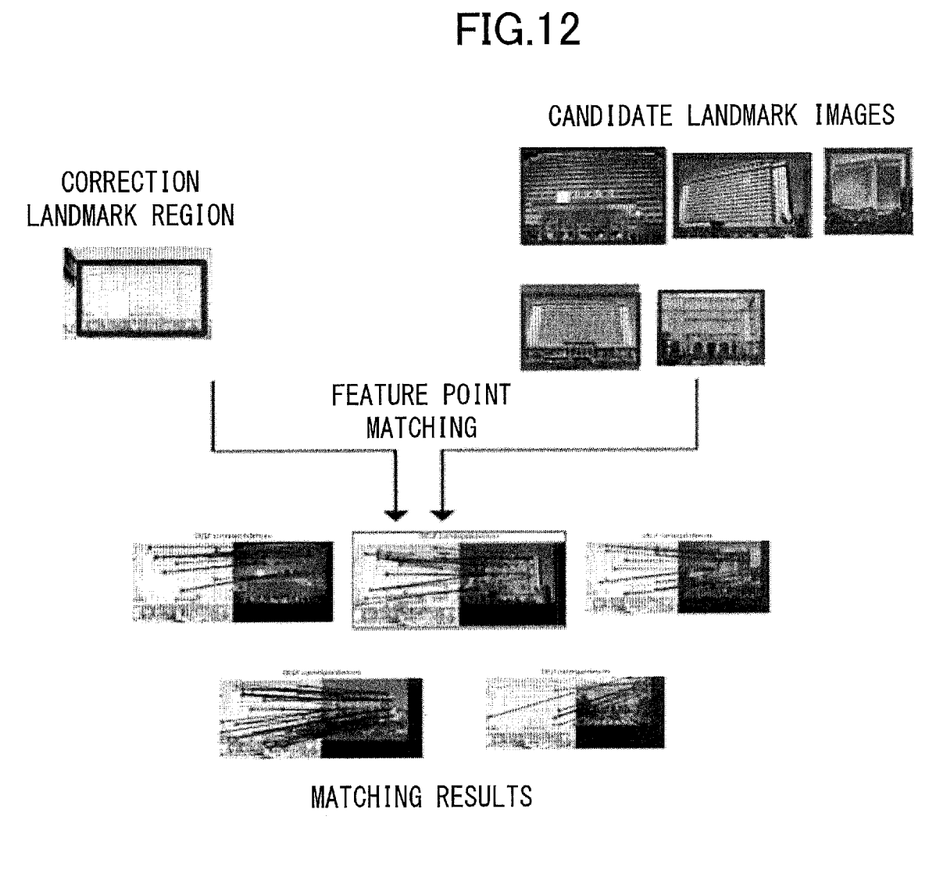
FIG. 12 illustrates extracting one or more features from a landmark region of a panoramic image and its corresponding candidate landmark images and conducting a matching process based on the extracted features in the method according to the first embodiment.

FIG. 12 illustrates an example of extracting features from a correction landmark region of a panoramic image and the corresponding candidate landmark images and conducting a matching process based on the extracted features.

In this example, a trained DELF model is adopted to determine the matched feature points between the correction landmark region and each candidate landmark image. Particularly, regarding the correction landmark region and each candidate landmark image to be matched, the feature points on the two images may be obtained by the DELF model, and this model may also determine the matched feature points between the two images. For example, as shown in the matching results in FIG. 12, there are multiple line segments generated by the matched feature points on the two images. It is apparent that for each candidate landmark image, the DELF model attains its feature points matching with the correction landmark region.

After determining the matched feature points between the correction landmark region and each candidate landmark image as set forth above, it is possible to select a candidate landmark image having the highest degree of matching with the correction landmark region according to at least one of the number, proportion, distribution, and average characteristics of the matched feature points, then identify the landmark in the landmark region as the landmark in the candidate landmark image with the highest matching degree.

In an example, the candidate landmark image with the largest number of matched feature points may be selected among from each candidate landmark image with the number of matched feature points higher than a predetermined threshold, and the landmark in the correction landmark region may be identified as the landmark in the candidate landmark image with the largest number of matched feature points.

In another example, it is possible to determine each candidate landmark image having a proportion of the number of matched feature points to the total number of matched feature points higher than a predetermined threshold, then choose a candidate landmark image with the highest proportion among from the determined candidate landmark images, and then identify the landmark in the correction landmark region as the landmark in the chosen candidate landmark image.

In still another example, in order to avoid a result in which the matched feature points are too discrete, each candidate landmark image whose uniformity of the matched feature points is higher than a predetermined threshold may be acquired, then a candidate landmark image with the largest number of matched feature points and/or the highest proportion of matched feature points may be selected among from the acquired candidate landmark images, and then the landmark in the correction landmark region may be identified as the landmark in the selected candidate landmark image.

In yet another example, considering that there may be a case where multiple candidate landmark images among all the candidate landmark images fetched from a pre-built database may correspond to the same known landmark, in order to balance the average feature of the same known landmark in the pre-built database so as to deal with the influence of different shooting conditions and the like on the same known landmark, it is possible to group the multiple candidate landmark images corresponding to the same known landmark, and calculate the average value of the number of matched feature points and/or the average value of the proportion of the number of matched feature points of each candidate known landmark image in this group. Subsequently, the best matched candidate landmark image may be determined on the basis of the average number of matched feature points and/or the average proportion of matched feature points.

Here it may be understood that any combination of the above examples can be used in the embodiments of the present disclosure. By making use of the matching result of the correction landmark region and each candidate landmark image, the most matched candidate landmark image can be determined among from the respective candidate landmark images, thereby being capable of ameliorating the accuracy of landmark recognition.

Up to here, the landmark recognition method according to this embodiment has been described in detail. In this method, by performing projection transformation on a panoramic image and carrying out semantic segmentation so as to determine a road surface region and a landmark region, it is possible to reduce the impact of the road surface region on the following landmark recognition. Furthermore, by conducting correction with respect to the landmark region so as to remove the distortion therein, it is possible to decrease the recognition error resulting from the distortion. Moreover, by determining the best matched known landmark in a pre-built database based on the correction landmark region according to various predetermined feature matching rules, it is possible to make better the efficiency and accuracy of landmark recognition in the panoramic image.

In addition, the method of recognizing a landmark in a panoramic image according to this embodiment may be applied to various scenes such as panoramic roaming, panoramic vision, immersive fitness, and the like. After the landmark in the panoramic image is identified, it is also possible to assign a name to the identified landmark in the panoramic image so that the interest of a user and the interaction with the user may be enhanced.

Second Embodiment

In this embodiment, according to one aspect, an apparatus (also called a landmark recognition apparatus) for recognizing a landmark in a panoramic image is provided that may conduct the landmark recognition method in accordance with the first embodiment.

Figure 13:
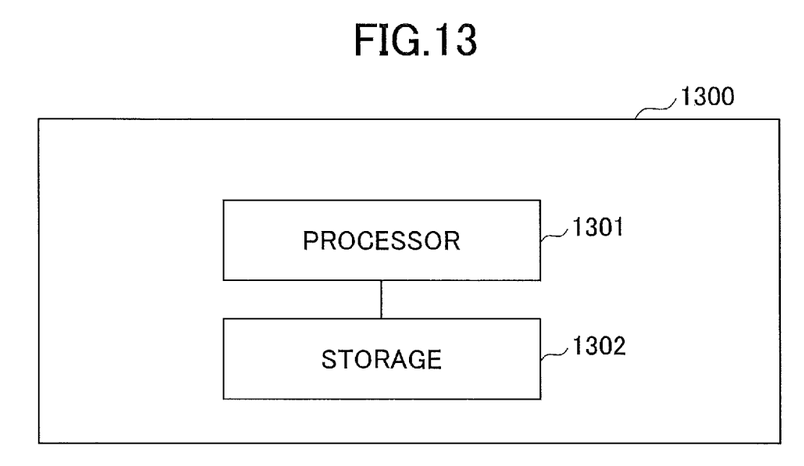
FIG. 13 is a block diagram of an apparatus for recognizing a landmark in a panoramic image according to a second embodiment of the present disclosure.

FIG. 13 is a block diagram of a landmark recognition apparatus 1300 according to this embodiment.

As presented in FIG. 13, the landmark recognition apparatus 1300 may contain a processor 1301 and a storage 1302 connected to the processor 1301. Of course, the landmark recognition apparatus 1300 may also include other units as needed.

The processor 1301 may be used to execute a computer program (i.e., computer-executable instructions) stored in the storage 1302 so as to fulfill the landmark recognition method in accordance with the first embodiment. The processor 1301 may adopt any one of the conventional processors in the related art.

The storage 1302 may be utilized to store the computer program and the relating data as well as the intermediate results generated when the processor 1301 conducts the computer program 342, for example. The storage 1302 may use any one of the existing storages in the related art.

Moreover, according to another aspect, a computer-executable program and a non-transitory computer-readable medium are provided. The computer-executable program may cause a computer to perform the landmark recognition method according to the first embodiment. The non-transitory computer-readable medium may store computer-executable instructions (i.e., the computer-executable program) for execution by a computer involving a processor. The computer-executable instructions may, when executed by the processor, render the processor to conduct the landmark recognition method in accordance with the first embodiment.

Here it should be noted that because the steps involved in the landmark recognition method have been concretely described in the first embodiment, the details of the steps are omitted in this embodiment for the sake of convenience.

Third Embodiment

This embodiment provides another landmark recognition apparatus for recognizing a landmark in a panoramic image.

Figure 14:
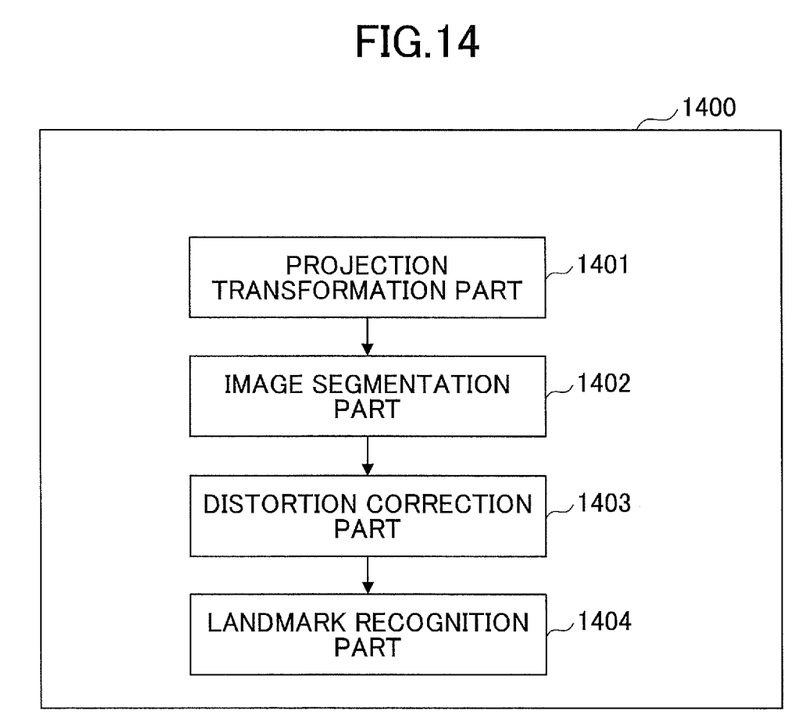
FIG. 14 is a block diagram of another apparatus for recognizing a landmark in a panoramic image according to a third embodiment of the present disclosure.

FIG. 14 is a block diagram of an apparatus 1400 for recognizing a landmark in a panoramic image according to this embodiment.

As illustrated in FIG. 14, the apparatus 1400 is inclusive of a projection transformation part 1401, an image segmentation part 1402, a distortion correction part 1403, and a landmark recognition part 1404. Of course, the apparatus 1400 may also include other parts as needed.

The apparatus 1400 may be configured to carry out the method of recognizing a landmark in a panoramic image according to the first embodiment.

Particularly, the projection transformation part 1401, the image segmentation part 1402, the distortion correction part 1403, and the landmark recognition part 1404 may be implemented to conduct STEPS S101 to S104 of FIG. 2, respectively.

Also, it should be noted that for the reason that STEPS S101 to S104 of FIG. 2 have been minutely described in the first embodiment, the details of them are omitted in this embodiment.

Up to here, the landmark recognition apparatus in accordance with this embodiment has been minutely described. In this method, by conducting projection transformation on a panoramic image and carrying out semantic segmentation so as to determine a road surface region and a landmark region, it is possible to reduce the influence of the road surface region on the subsequent landmark recognition. Furthermore, by performing correction on the landmark region so as to do away with the distortion therein, it is possible to decrease the recognition error resulting from the distortion. Moreover, by determining the most matched known landmark in a pre-built database based on the correction landmark region according to various predetermined feature matching rules, it is possible to improve the efficiency and accuracy of landmark recognition in the panoramic image.

Additionally, the apparatus for recognizing a landmark in a panoramic image according to this embodiment may be applied to various scenes such as panoramic roaming, panoramic vision, immersive fitness, and so forth. After the landmark in the panoramic image is recognized, a title may be given to the recognized landmark in the panoramic image, wherefore it is possible to enhance the interest of a user and the interaction with the user.

Here it should be noted that the above embodiments are just exemplary ones, and the specific structure and operation of them may not be used for limiting the present disclosure.

Furthermore, the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202010185255.5 filed on Mar. 17, 2020, the entire contents of which are hereby incorporated by reference.

What is claimed is:

1. A method of recognizing a landmark in a panoramic image, comprising:
    performing stereographic-projection based transformation on the panoramic image so as to generate a projection image;
    conducting semantic segmentation on the projection image so as to determine a landmark region and a road surface region;
    correcting distortion, generated as a result of projecting horizontal lines in the panoramic image onto arcs and vertical lines in the panoramic image onto rays, in the landmark region so as to produce a corrected landmark region, the correcting including
        projecting pixel points on each arc corresponding to the horizontal lines in the panoramic image within the landmark region onto a corresponding straight line, and
        carrying out data compression with respect to pixel points projected onto each straight line to make the number of pixel points on each straight line be the same in the corrected landmark region; and
    recognizing the landmark in the corrected landmark region.

2. The method in accordance with claim 1, wherein, the conducting semantic segmentation on the projection image so as to determine a landmark region and a road surface region includes
    detecting arcs and rays in the projection image; and
    filtering the detected arcs and rays based on their semantic characteristics and determining the landmark region and the road surface region in the projection image based on remaining arcs and rays.

3. The method in accordance with claim 2, wherein, the filtering the detected arcs and rays based on their semantic characteristics and determining the landmark region and the road surface region in the projection image based on remaining arcs and rays includes:
    filtering out, based on the semantic characteristics of the detected arcs and rays, at least one of an arc(s) whose center is not on a projection center, a ray(s) that is not emitted from the projection center, an arc(s) whose radius is less than a predetermined threshold, and an isolated arc(s); and
    determining a closed region formed by the remaining arcs as the road surface region and a fan-shaped region formed by the remaining rays and arcs outside the closed region as the landmark region.

4. The method in accordance with claim 1, wherein, the recognizing the landmark in the corrected landmark region includes
    performing landmark detection on the corrected landmark region based on similarities between the corrected landmark region and known landmark images, so as to determine at least one candidate landmark image among from the known landmark images; and conducting feature matching on the corrected landmark region and each candidate landmark image and recognizing the landmark in the corrected landmark region based on feature matching results.

5. The method in accordance with claim 4, wherein, the conducting feature matching on the corrected landmark region and each candidate landmark image and recognizing the landmark in the corrected landmark region based on feature matching results includes scaling the corrected landmark region and each candidate landmark image to a same resolution;

extracting a feature(s) from the corrected landmark region and each candidate landmark image having the same resolution and conducting feature matching with respect to the extracted feature(s), so as to determine matched feature points between the corrected landmark region and each candidate landmark image having the same resolution; and selecting, based on at least one of a number of the matched feature points, a proportion of the matched feature points, distribution of the matched feature points, and average characteristics of the matched feature points, a candidate landmark image having a highest degree of matching with the corrected landmark region among from the at least one candidate landmark image, and identifying the landmark in the corrected landmark region as a landmark in the candidate landmark image having the highest degree of matching.

6. A non-transitory computer-readable medium having computer-executable instructions for execution by a processor, wherein, the computer-executable instructions, when executed by the processor, cause the processor to conduct the method of recognizing a landmark in a panoramic image in accordance with claim 1.

7. An apparatus for recognizing a landmark in a panoramic image, comprising:

a processor; and a memory storing computer executable instructions that cause the processor to perform stereographic-projection based transformation on the panoramic image so as to generate a projection image;

conduct semantic segmentation on the projection image so as to determine a landmark region and a road surface region;

correct distortion, generated as a result of projecting horizontal lines in the panoramic image onto arcs and vertical lines in the panoramic image onto rays, in the landmark region so as to produce a corrected landmark region, the correcting of the distortion including projecting pixel points on each arc corresponding to the horizontal lines in the panoramic image within the landmark region onto a corresponding straight line, carrying out data compression with respect to pixel points projected onto each straight line to make the number of pixel points on each straight line be the same in the corrected landmark region; and recognize the landmark in the corrected landmark region.

8. The apparatus in accordance with claim 7, wherein the conducting of semantic segmentation on the projection image includes processes of detecting arcs and rays in the projection image; and filtering the detected arcs and rays based on their semantic characteristics and determining the landmark region and the road surface region in the projection image based on remaining arcs and rays.

9. The apparatus in accordance with claim 8, wherein, the filtering of the detected arcs and rays based on their semantic characteristics and the determining of the landmark region and the road surface region in the projection image based on remaining arcs and rays includes processes of filtering out, based on the semantic characteristics of the detected arcs and rays, at least one of an arc(s) whose center is not on a projection center, a ray(s) that is not emitted from the projection center, an arc(s) whose radius is less than a predetermined threshold, and an isolated arc(s); and determining a closed region formed by the remaining arcs as the road surface region and a fan-shaped region formed by the remaining rays and arcs outside the closed region as the landmark region.

10. The apparatus in accordance with claim 7, wherein, the recognizing of the landmark includes processes of performing landmark detection on the corrected landmark region based on similarities between the corrected landmark region and known landmark images, so as to determine at least one candidate landmark image among from the known landmark images; and conducting feature matching on the corrected landmark region and each candidate landmark image and recognizing the landmark in the corrected landmark region based on feature matching results.

11. The apparatus in accordance with claim 10, wherein, the conducting feature matching on the corrected landmark region and each candidate landmark image and recognizing the landmark in the corrected landmark region based on feature matching results includes scaling the corrected landmark region and each candidate landmark image to a same resolution;

extracting a feature(s) from the corrected landmark region and each candidate landmark image having the same resolution and conducting feature matching with respect to the extracted feature(s), so as to determine matched feature points between the corrected landmark region and each candidate landmark image having the same resolution; and selecting, based on at least one of a number of the matched feature points, a proportion of the matched feature points, distribution of the matched feature points, and average characteristics of the matched feature points, a candidate landmark image having a highest degree of matching with the corrected landmark region among from the at least one candidate landmark image, and identifying the landmark in the corrected landmark region as a landmark in the candidate landmark image having the highest degree of matching.

* * * * *